(12) United States Patent
Kato

(10) Patent No.: US 7,027,294 B2
(45) Date of Patent: Apr. 11, 2006

(54) HINGE FOR ELECTRONIC EQUIPMENT AND ELECTRONIC EQUIPMENT USING THE SAME

(75) Inventor: Hideo Kato, Kanagawa (JP)

(73) Assignee: Katoh Electrical Machinery Co., Ltd., Kanagawa (JP)

( * ) Notice: Subject to any disclaimer, the term of this patent is extended or adjusted under 35 U.S.C. 154(b) by 249 days.

(21) Appl. No.: 10/729,255

(22) Filed: Dec. 5, 2003

(65) Prior Publication Data

US 2005/0120515 A1 Jun. 9, 2005

(51) Int. Cl.
*H05K 5/00* (2006.01)
(52) U.S. Cl. .................. 361/679; 361/681; 379/433.11
(58) Field of Classification Search ................ 361/679, 361/681, 683; 379/433.11
See application file for complete search history.

(56) References Cited

U.S. PATENT DOCUMENTS

| 5,436,954 A | * | 7/1995 | Nishiyama et al. ......... 455/566 |
| 5,724,683 A | * | 3/1998 | Sorimachi et al. ............. 4/248 |
| 2001/0053674 A1 | * | 12/2001 | Katoh | |

* cited by examiner

*Primary Examiner*—Yean-Hsi Chang
(74) *Attorney, Agent, or Firm*—Notaro & Michalos PC

(57) ABSTRACT

A hinge connects two members and has a rotation arrester in one of the members. A shaft connected to the body has a slide key at its opposite end. The key constrains rotation but is axially slidable and has an arrester. An outer cam with an arrester is in the other member. An inner cam in the outer cam, passes the key and has an arresting projection that disengages from the arrester of the key at a selected angle. A slider cam confronting the inner and outer cams, is slidably mounted in the body to constrain rotation. Two springs with differing elastic force are between the slider cam and the body, and between the slide key and outer cam. A push-button on the key is engaged to the arresting projection to block rotation. Pressing the push-button disengages the arrester to allow rotation.

4 Claims, 23 Drawing Sheets

HINGE FOR ELECTRONIC EQUIPMENT AND ELECTRONIC EQUIPMENT USING THE SAME

BACKGROUND OF THE INVENTION

1. Field of the Invention

The present invention relates to a hinge for electronic equipment suitable for use with an electronic equipment having a keyboard, which is a first member, and a display device, which is a second member, both of which being connected and folded into two specifically as in the case of a portable telephone and a pocket computer, and to an electronic equipment using the same.

2. Description of the Related Art

Conventionally, as a hinge for electronic equipment for a portable telephone, which is a kind of electronic equipment having a twofold structure where a transmitter section having a keyboard being a first member and a receiver section having a display device being a second member are constructed in an openable and closable manner to each other, such a hinge for electronic equipment that the transmitter section and the receiver section can be locked in a fully-closed state and the transmitter section and the receiver section can be opened automatically to a predetermined angle by pressing a push-button, and such a portable telephone using the hinge for electronic equipment are publicly known as disclosed for example in Japanese Patent Laid-open No. Hei 8-125725.

SUMMARY OF THE INVENTION

In a hinge for electronic equipment of a publicly-known structure, there are provided a torsion spring wound around a hinge shaft elastically between a cylindrical mounting portion of a transmitter section and a cylindrical mounting portion of a receiver section both of which are connected free to fold into two via the hinge shaft; an arresting means between the cylindrical mounting portions of the transmitter section and the receiver section for arresting an end portion of the torsion spring by the cylindrical mounting portion of the receiver section only when the receiver section is opened at and over a predetermined open angle; a cam mechanism between the cylindrical mounting portions of the transmitter section and the receiver section, which is set up to operate when pressing the push-button axially provided in the cylindrical mounting portion of the transmitter section so that the receiver section rotates to the position where the arresting means arrests the end portion of the torsion spring; a locking means in the cylindrical mounting portion of the receiver section, unlocking the receiver section arrested at the cylindrical mounting portion of the transmitter section by pressing the push-button; and a friction mechanism for stopping the receiver section freely at any angle from the predetermined open angle.

The above-described arresting means is composed of an arresting portion for arresting the end portion of the torsion spring provided on an end face of a rotor accommodated in the cylindrical mounting portion of the receiver section, an inclined portion provided at the arresting portion in the direction of the torsion spring being wound back, and an arresting groove placed in the axial direction of the torsion spring in the cylindrical mounting portion of the transmitter section so as to arrest the end portion of the torsion spring which is disengaged from the arresting portion. The above-described cam mechanism is composed of a pressing cam portion projecting on the end face of the push-button and a pressure receiving cam portion, which has an inclined portion projecting at the position confronting the pressing cam portion, on the end face of the rotor accommodated in the cylindrical mounting portion of the receiver section. The above-described locking means is composed of a locking member having the hinge shaft inserted in the axial direction and accommodated in the cylindrical mounting portion of the receiver section in a slidable manner while being applied a force to slide in one direction by means of a compression spring, and a locking groove provided axially from the end face of the cylindrical mounting portion of the transmitter section for enabling rising and setting of the lock member. The above-described friction mechanism is composed of a first convex portion provided on the end face of the cylindrical mounting portion of the receiver section and a second convex portion provided on the end face of the cylindrical mounting portion of the receiver section so that the second convex portion presses against the first convex portion on the end face when the receiver section is at the predetermined open angle.

In the publicly-known hinge for electronic equipment described above, there are such advantages that the transmitter section and the receiver section can be opened manually, and that they can be opened automatically to a predetermined open angle by pressing the push-button and can be stopped freely at any angle up to a full-open angle. However, there are also such problems that many parts are required, that structure is complicated, that so small is an automatic open angle of itself that needs additional manual opening thereafter for operating operation keys on the keyboard of the transmitter section, and that a display screen of a display device of the receiver section is not enough visible, that one hand operation for opening fully leaves an operational problem, and that its assembling process into a portable telephone takes time and trouble.

The publicly-known portable telephone described above is so structured that the transmitter section and the receiver section are unlocked and opened automatically a little by pressing the opening and closing push-button provided at the hinge, therefore following opening operation is to be performed by hand. There is such a problem that, in the automatically opened position, it is difficult to operate the operation keys on the keyboard of the transmitter section and to confirm such contents by eyes as shown on the display screen, requiring additional opening operation by hand.

It is an object of the present invention to provide a hinge for electronic equipment which can open and close manually a first member and a second member of an electronic equipment connected in an openable and closable manner to each other, and also can open automatically the first member and the second member to an open angle usable and operationable by pressing a push-button.

It is another object of the present invention to provide such an electronic equipment that composed of a first member and a second member connected in an openable and closable manner to each other via a hinge, the first member and the second member being made automatically openable with the hinge devised to a usable angle or a predetermined open angle by pressing a push-button provided at the hinge and being made manually closable from the automatically opened angle.

In order to achieve the above-described objects, the present invention is made as a hinge connecting a first member and a second member in an openable and closable manner to each other, as a hinge for electronic equipment, which is composed of a case body having a rotation arresting means on an outer periphery thereof, inserted into and arrested at one of cylindrical mounting portions of the first member and the second member; a shaft mounted by passing axially through a center portion of the case body with an end portion side thereof being arrested at the case body; a slide key mounted on the shaft in a manner constrained rotation and in an axially slidable manner, and having an arresting portion at an end portion thereof; an outer cam having a rotation arresting means on an outer periphery thereof and inserted into and arrested at one of the other cylindrical mounting portions of the first member and the second member, accommodating the slide key inside thereof in axially slidable manner and provided in a manner constrained rotation by the shaft; an inner cam accommodated in an axially slidable manner in the outer cam which passes the slide key together with the shaft axially through the center portion of the outer cam, having an arresting projection which disengages from the arresting portion of the slide key in accordance with a rotation angle; a slider cam provided in confrontation with the inner cam and the outer cam and passing the shaft axially through the center portion thereof, being mounted in an axially slidable manner in the case body in a manner of constrained rotation; a first compression spring elastically provided between the slider cam and the case body; a second compression spring elastically provided between the slide key and the outer cam and having less elastic force than that of the first compression spring; and a push-button mounted on the slide key, in which the outer cam and inner cam have cam portions in a same direction and the slider cam has a cam portion on the side confronting the cam portions of the outer cam and the inner cam; a convex portion of the cam portion of the slider cam normally engages with the arresting projection of the inner cam of which rotation is blocked by the slide key, whereas, a pressing operation of the push-button disengages the arresting portion of the slide key from the arresting projection of the inner cam so that the cam portion of the slider cam is guided to the cam portion of the outer cam to thereby rotate together with the case body.

In the present invention of this occasion, the inner cam may be composed of a deformed through hole for engaging with the arresting portion of the slide key to block rotation of the slide key; a circular through hole for allowing rotation of the arresting portion of the slide key; and a stepped portion provided to block an axial movement of the arresting portion in the circular through hole in accordance with the rotation angle.

In the present invention, further, a means for allowing the slide key to slide axially under conditions of being constrained rotation against the shaft may be a long hole provided axially by passing radially through the slide key and a pin mounted on the shaft which engages with the long hole, and at the same time, a means for securing the outer cam to the shaft may be the pin.

Further, the present invention is made also, as an electronic equipment, the hinge for electronic equipment with structures mentioned above is used in a connecting section of a first member and a second member connected in an openable and closable manner to each other.

DETAILED DESCRIPTION OF THE PREFERRED EMBODIMENT

Hereinafter, the present invention will be described as to a case embodied in a portable telephone as an example of electronic equipment. However, the present invention may apply to other electronic equipment such as a pocket computer, a notebook type personal computer, and the like, as a hinge connecting for example a keyboard which composes a first member and a display device which composes a second member in an openable and closeable manner to each other.

Figure 1:
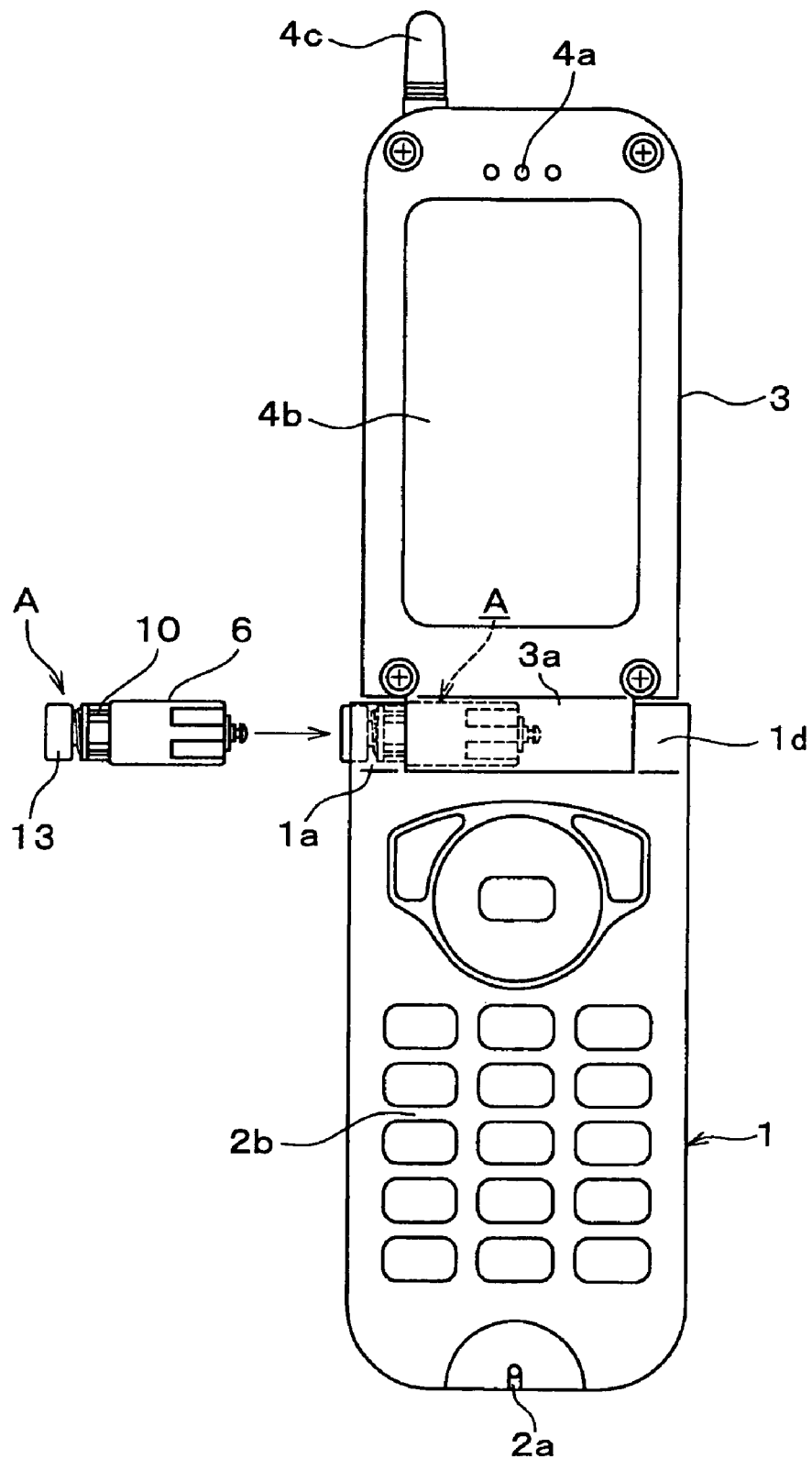
FIG. 1 is a plan view of a portable telephone using a hinge for electronic equipment according to the present invention showing a state where a transmitter section and a receiver section are opened.

The drawings show one embodiment of the present invention where a reference number 1 in FIG. 1 denotes a transmitter section of the portable telephone as a kind of electronic equipment, composing the first member. On the surface thereof, a microphone 2a and a keyboard 2b are provided. A reference number 3 denotes a receiver section of the portable telephone similarly as a kind of electronic equipment, composing the second member. On the surface thereof, an earphone 4a and a display device 4b using for example liquid crystal are provided. At each end portion of the transmitter section 1 and the receiver section 3, cylindrical mounting portions 1a, 1d, and 3a are provided, composing a connecting section. The respective cylindrical mounting portions 1a and 3a are connected in an openable and closeable manner to each other by means of a push-open type hinge A for electronic equipment relating to the present invention. Incidentally, a reference number 4c denotes an antenna.

Figure 6:
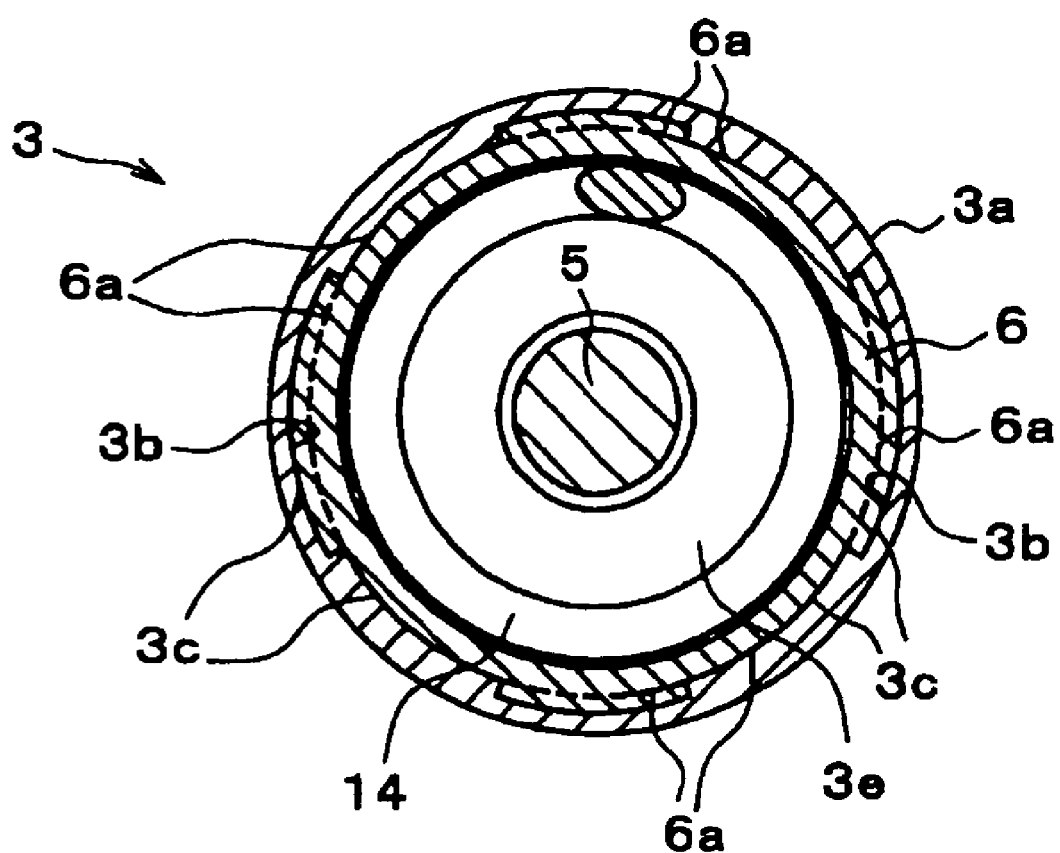
FIG. 6 is a sectional view taken along the A—A line in FIG. 1.
Figure 7:
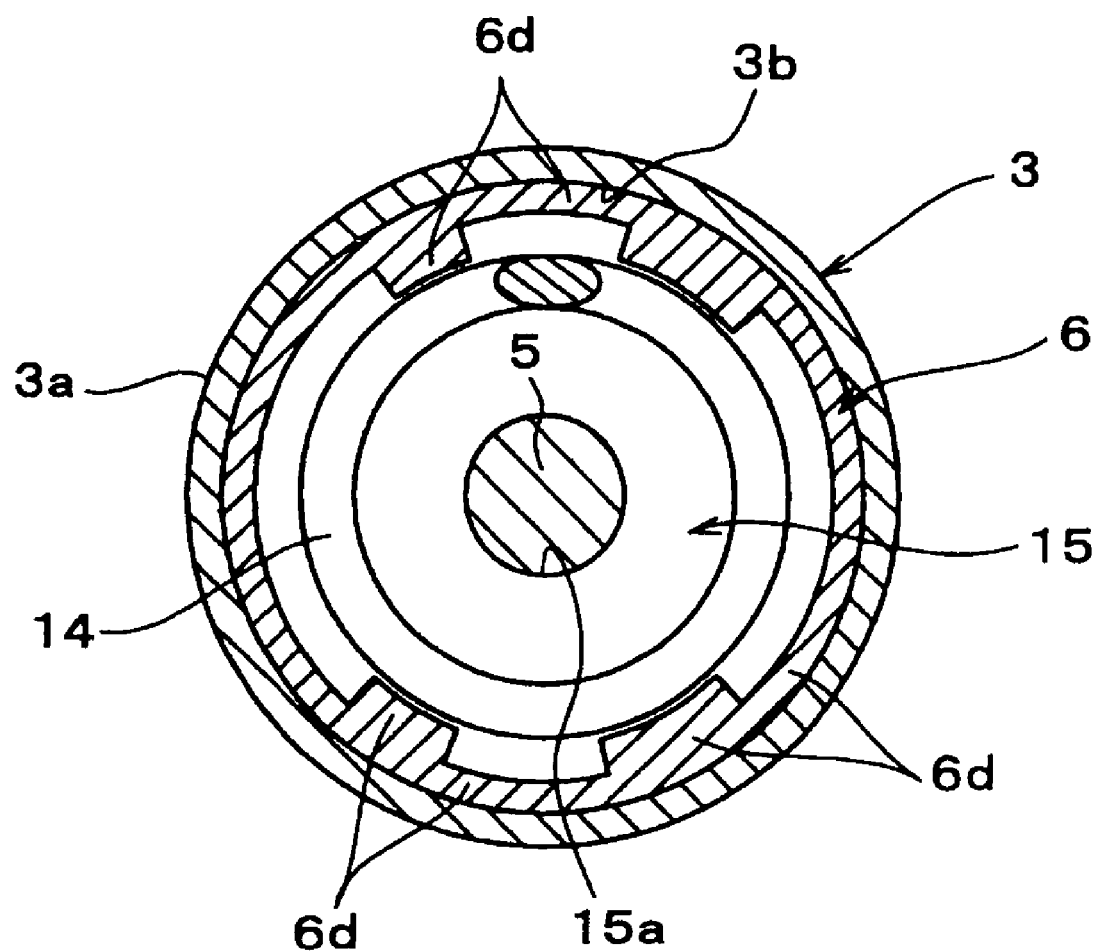
FIG. 7 is a sectional view taken along the B—B line in FIG. 1.
Figure 8:
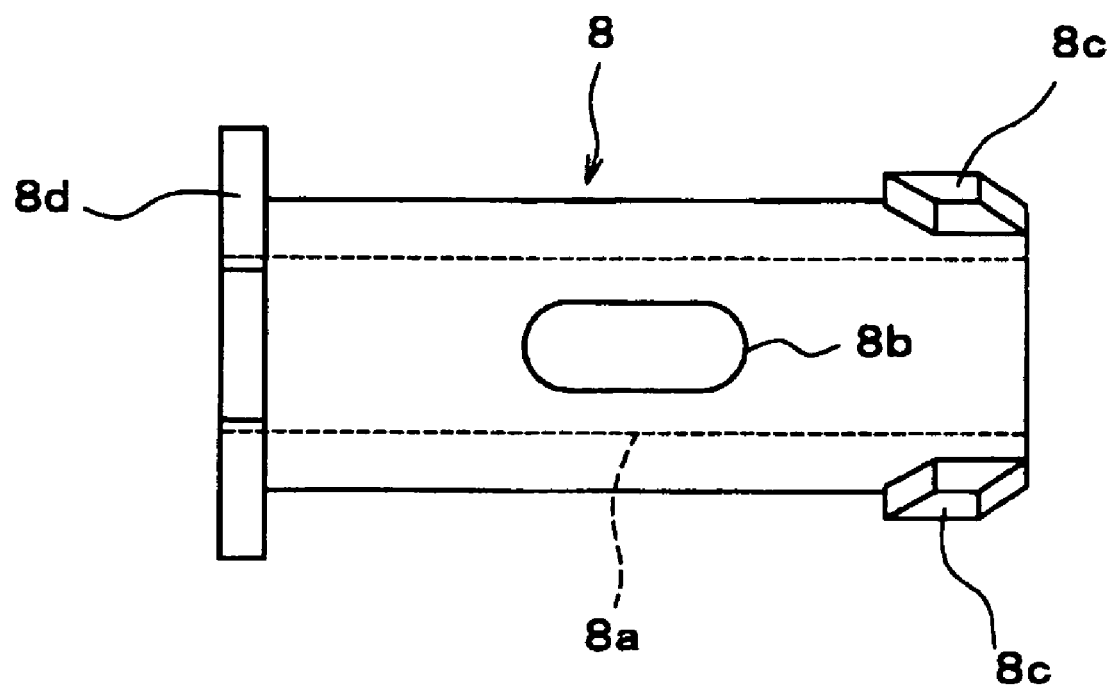
FIG. 8 is a plan view of a slide key.
Figure 9:
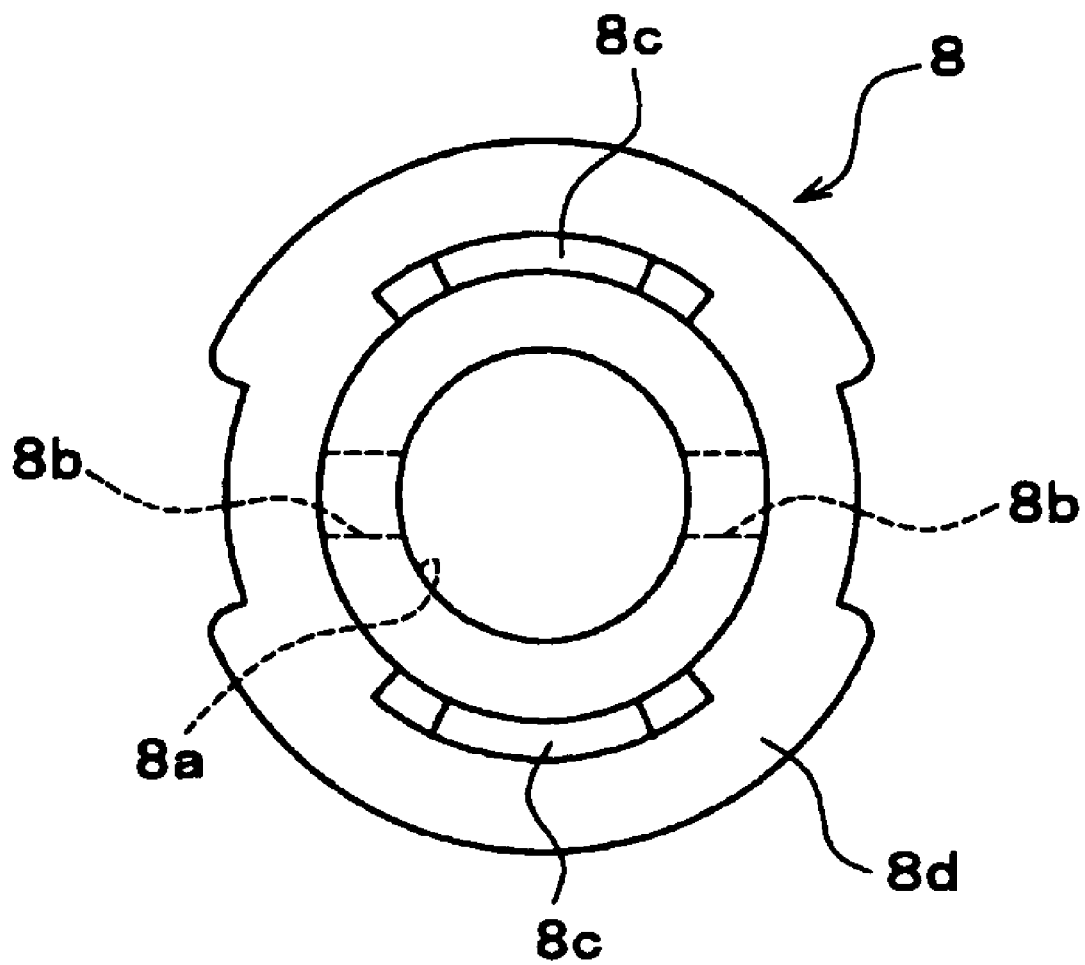
FIG. 9 is a right side view of the slide key.
Figure 10:
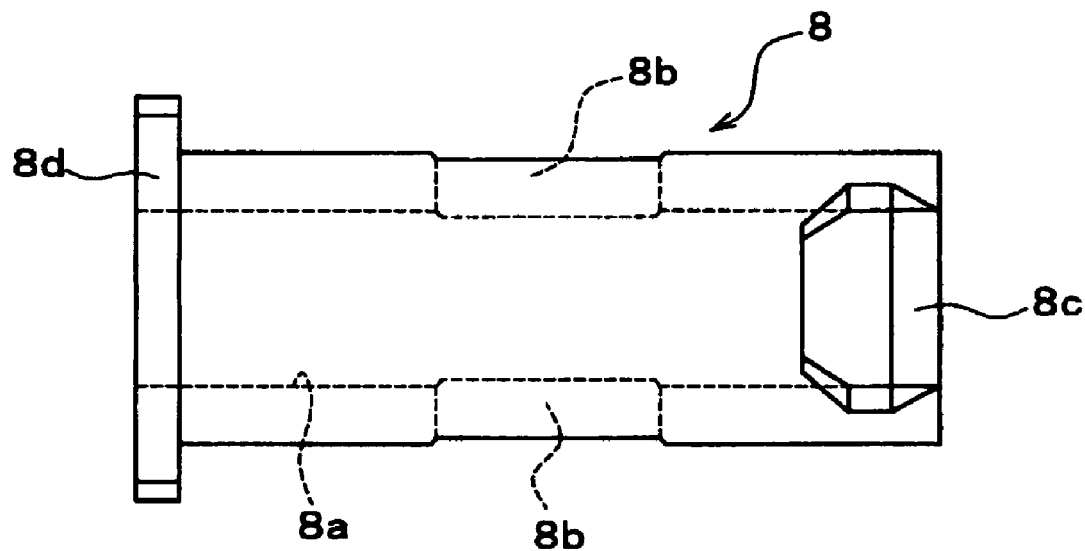
FIG. 10 is a front view of the slide key.

Next, a structure of the push-open type hinge A for electronic equipment relating to the present invention will be described. FIGS. 2 to 22 show the structure and parts of the hinge A for electronic equipment, where a reference number 5 denotes a shaft made for example of brass in the drawings. The shaft 5 having a flange portion 5a at an end portion thereof passes through a center portion of a case body 6 in the axial direction, while being received and arrested by a bearing hole 6c provided on a sidewall 6b of the case body 6. The case body 6 has a rotation arresting means 6a composed of a convex portion and a concave portion on outer periphery thereof. The case body 6 is inserted into a mounting hole 3b provided in the cylindrical mounting portion 3a of the receiver section 3. As specifically shown in FIG. 6, the case body 6 is so structured that rotates together with the cylindrical mounting portion 3a by engaging the rotation arresting means 6a with an engaging portion 3c which is composed of a convex portion and a concave portion provided in the mounting hole 3b. The shaft 5 is arrested by means of a washer 18 and an E ring 7 at a partition 3e provided in the cylindrical mounting portion 3a.

Figure 2:
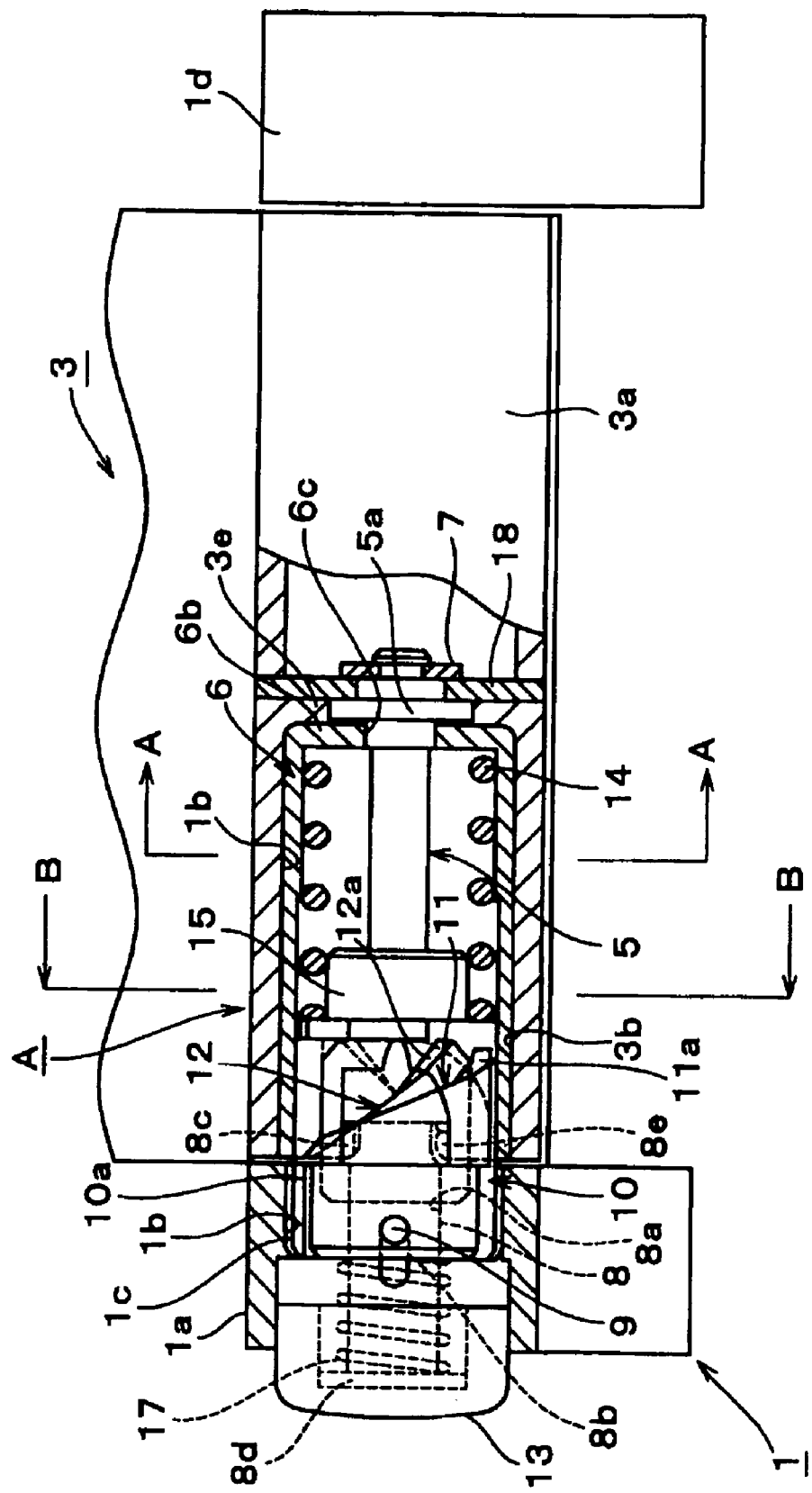
FIG. 2 is a partially sectional plan view corresponding to FIG. 1 illustrating a state of the hinge for electronic equipment in use according to the present invention.
Figure 3:
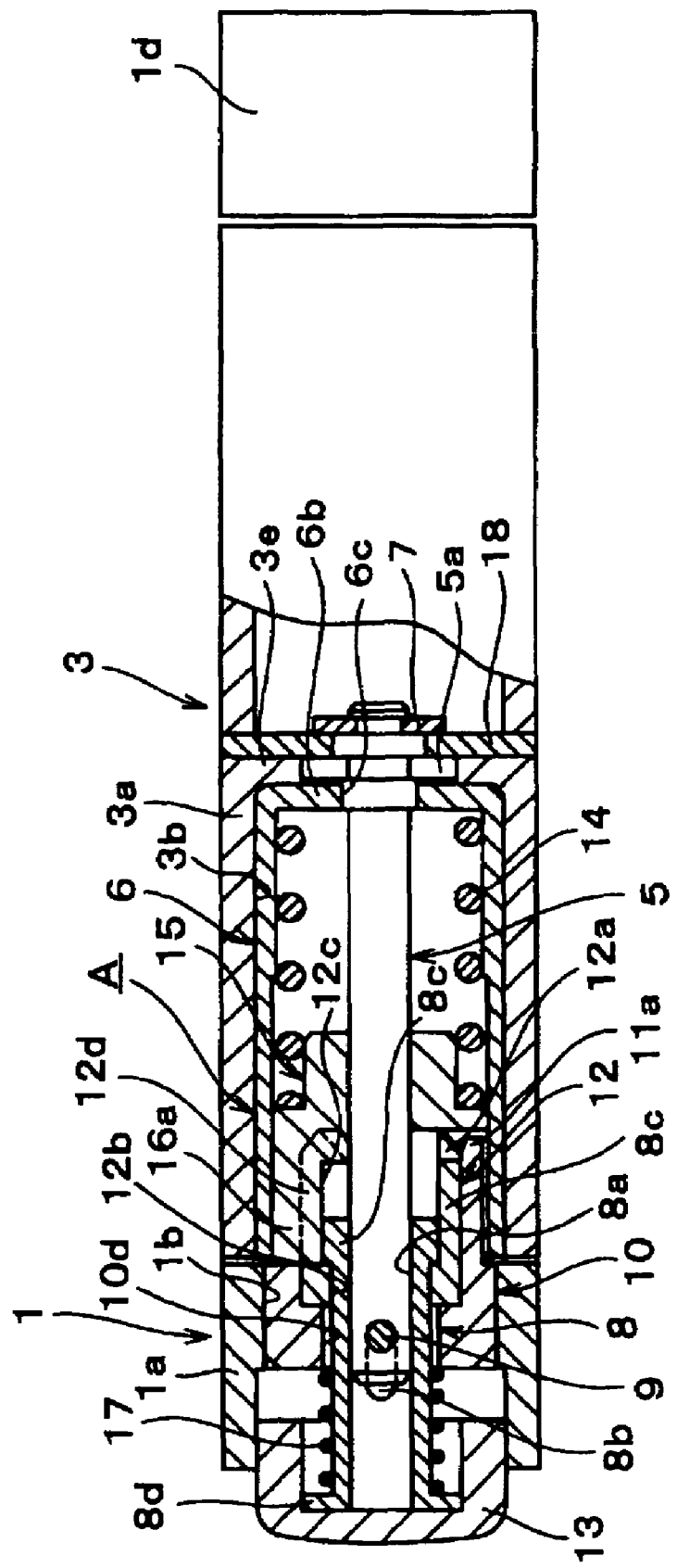
FIG. 3 is a sectional plan view corresponding to FIG. 2 illustrating a state of the hinge for electronic equipment in use according to the present invention.
Figure 4:
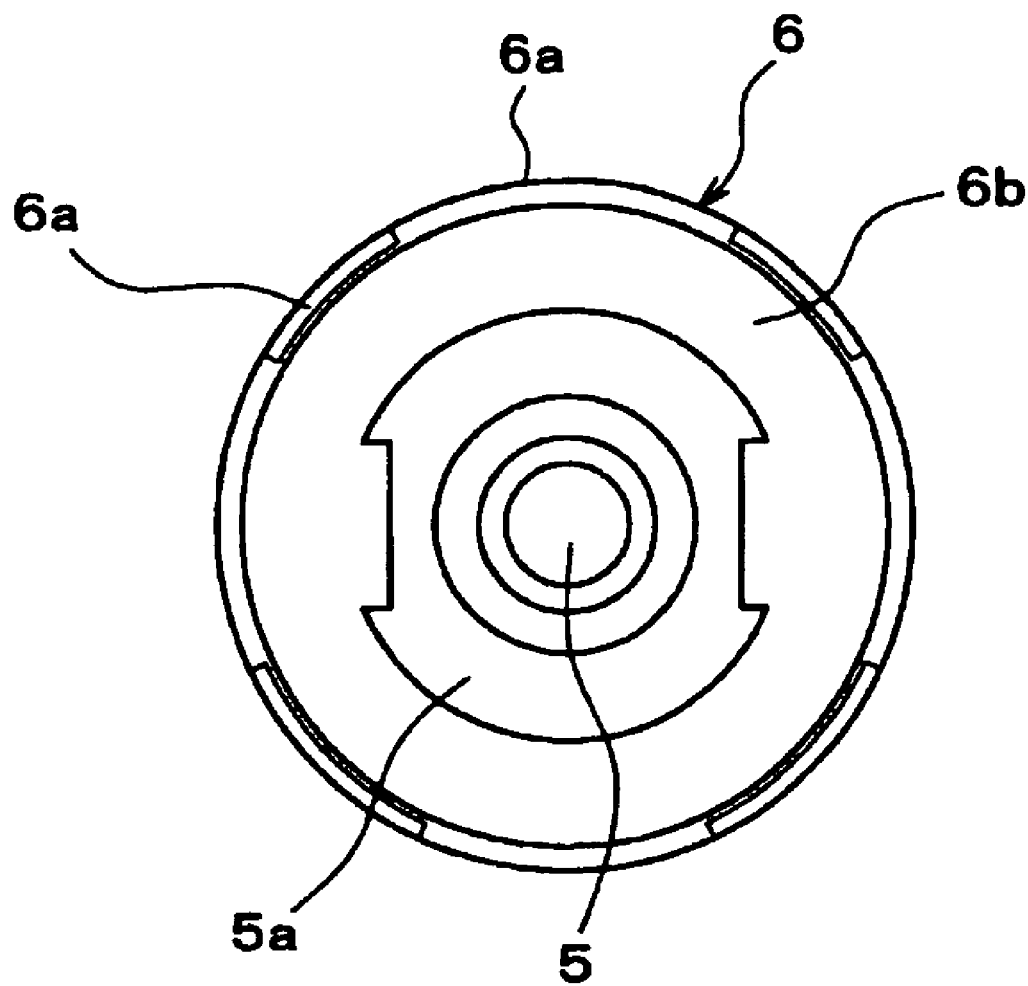
FIG. 4 is a sectional view on right side of the hinge for electronic equipment shown in FIG. 1.
Figure 5:
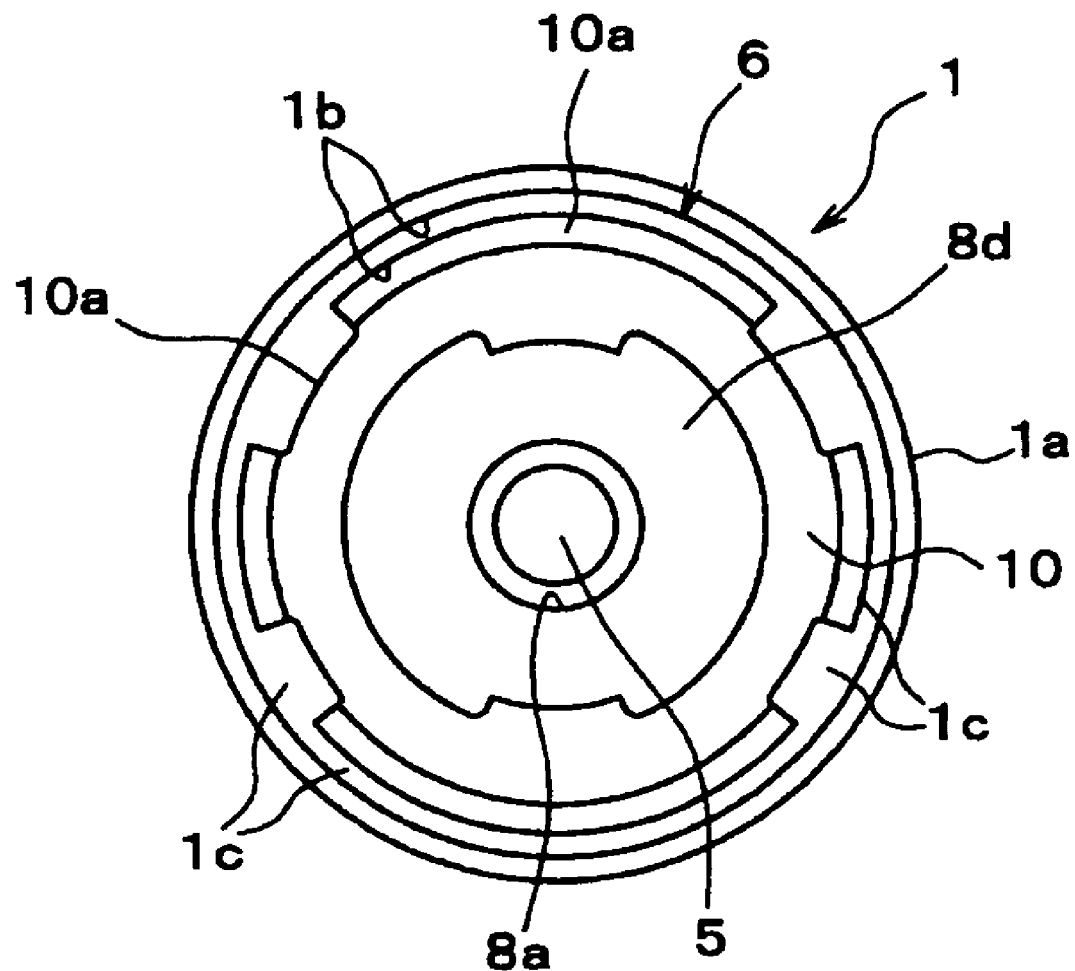
FIG. 5 is a left side view of the hinge for electronic equipment shown in FIG. 1 in a state where a push-button thereof is dismounted.

On a free end side of the shaft 5 projecting from an open end of the case body 6, as specifically shown in FIG. 3, a slide key 8 is mounted in an axially slidable manner while accepting a tip of the shaft 5 into a through hole 8a provided axially at the center portion thereof under the conditions constrained rotation by the shaft 5. A means for mounting the slide key 8 in the state where rotation is constrained by the shaft 5 is composed of, as specifically shown in FIG. 2 and FIG. 3, long holes 8b, 8b provided radially and axially in the slide key 8 and a pin 9 mounted on the shaft 5 having the long holes 8b, 8b engaged therewith. The pin 9 and the long holes 8b, 8b, make the slide key 8 axially slidable in a limited length. On the slide key 8, as specifically shown in FIG. 8 to FIG. 10, arresting portions 8c, 8c are provided at intervals of 180° on the outer periphery of one end portion thereof, and a flange portion 8d is provided at the other end portion thereof.

Figure 11:
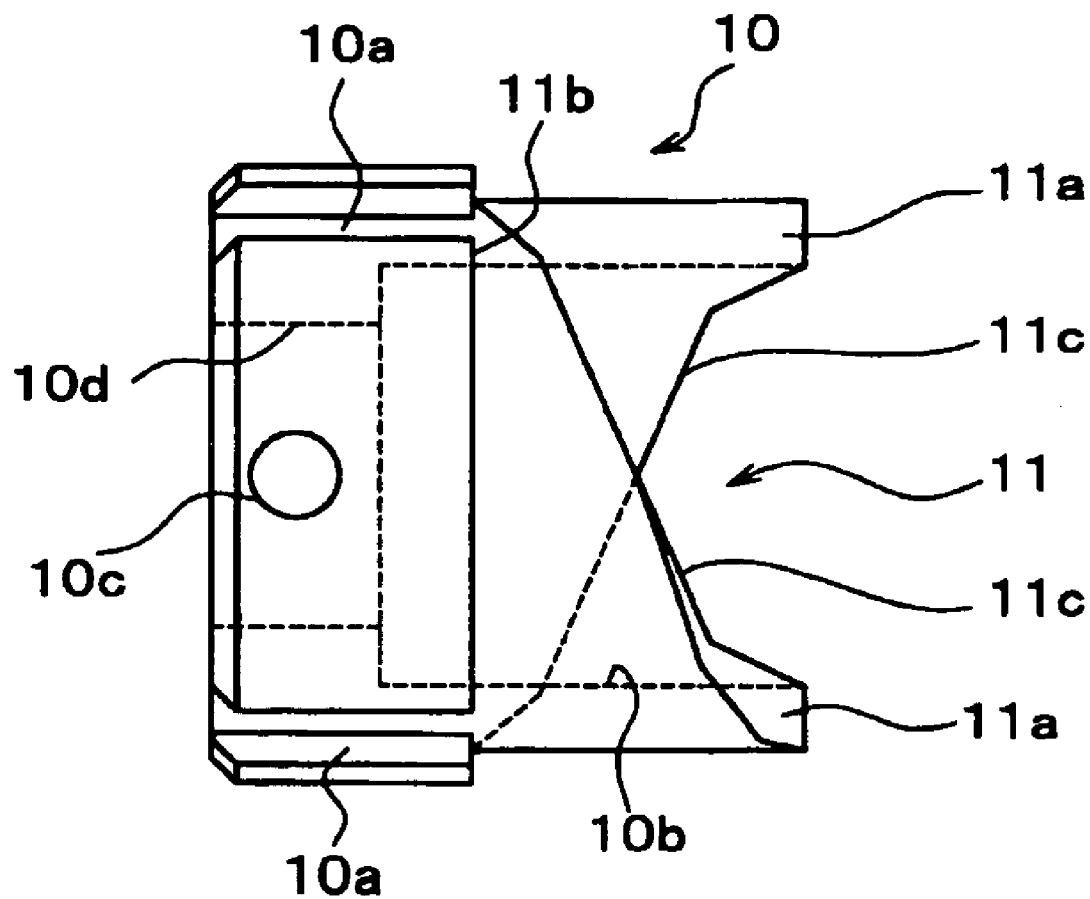
FIG. 11 is a plan view of an outer cam.
Figure 12:
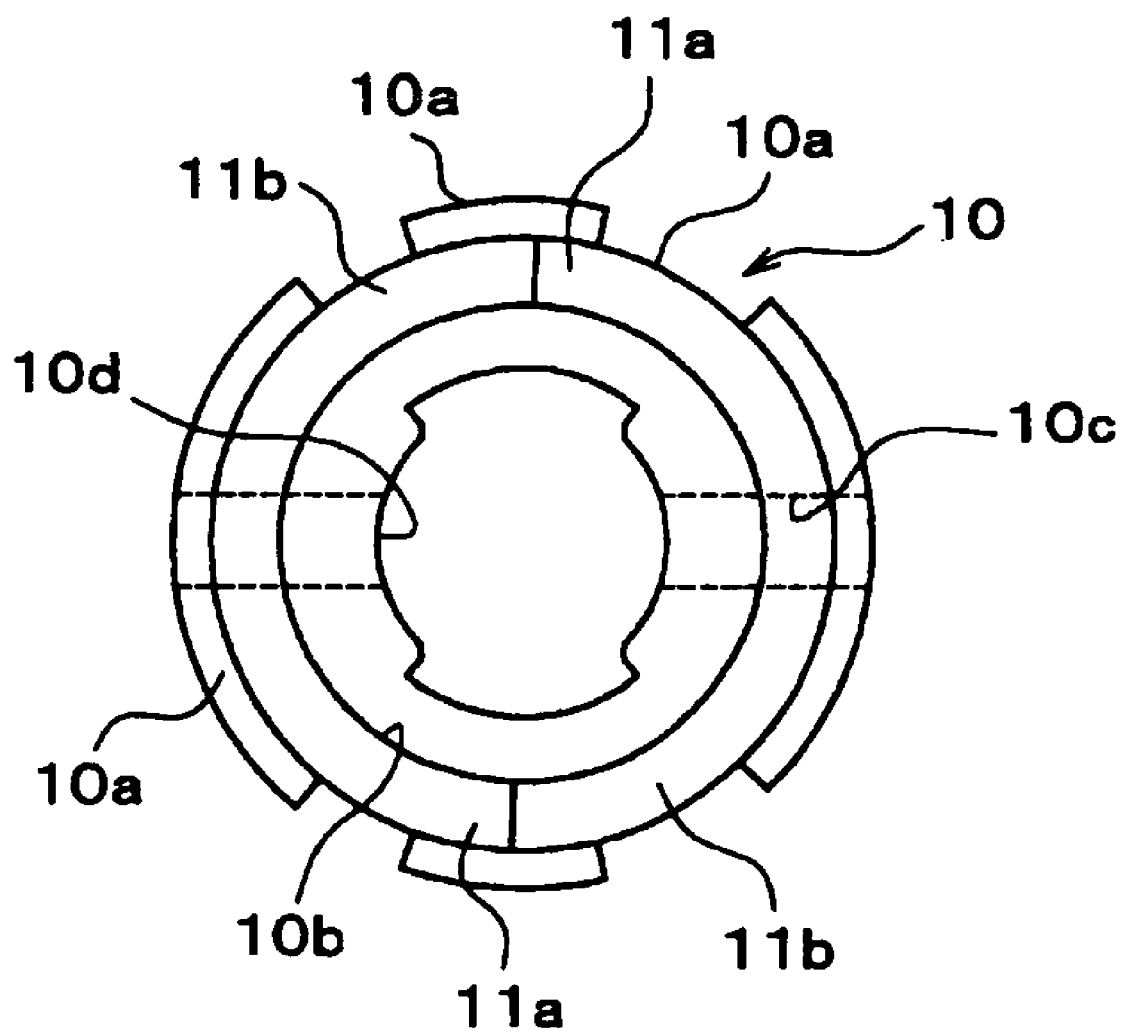
FIG. 12 is a right side view of the outer cam.
Figure 13:
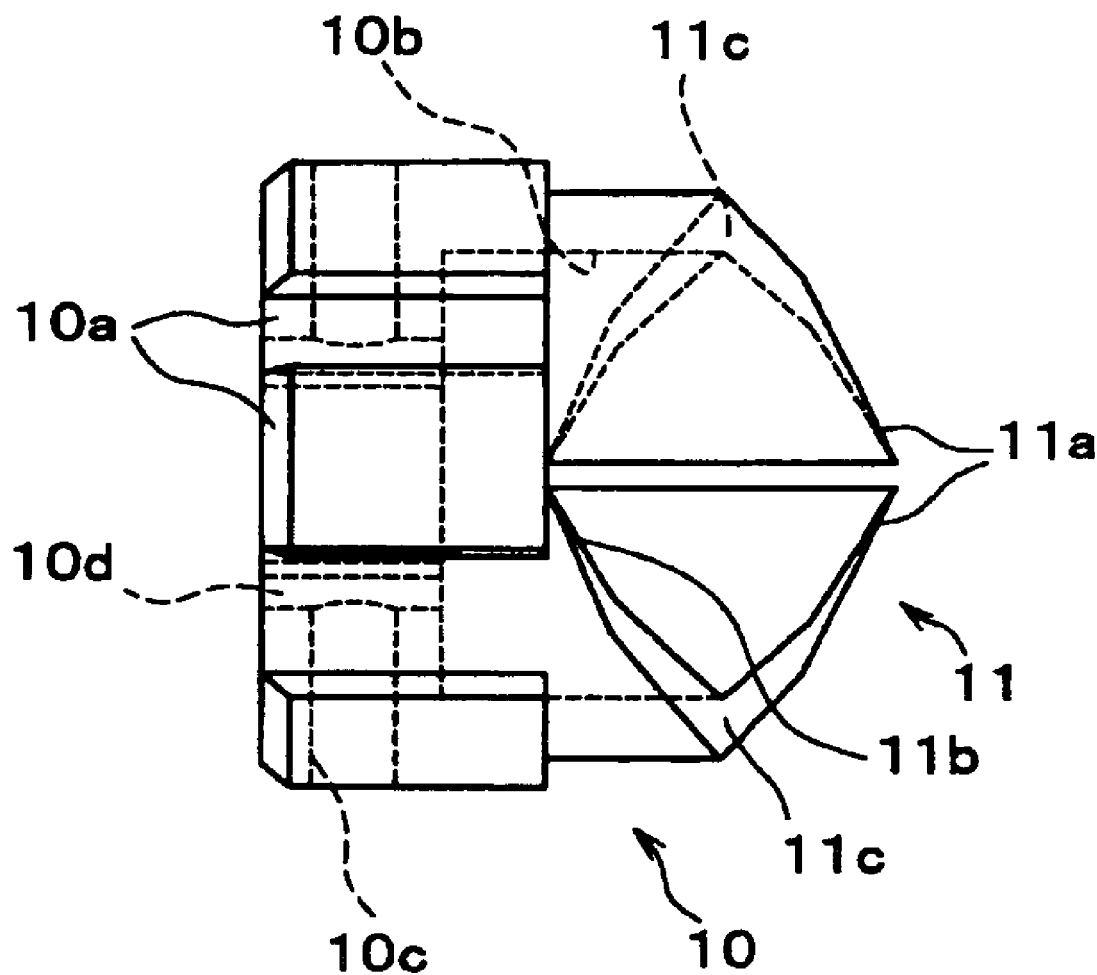
FIG. 13 is a front view of the outer cam.
Figure 14:
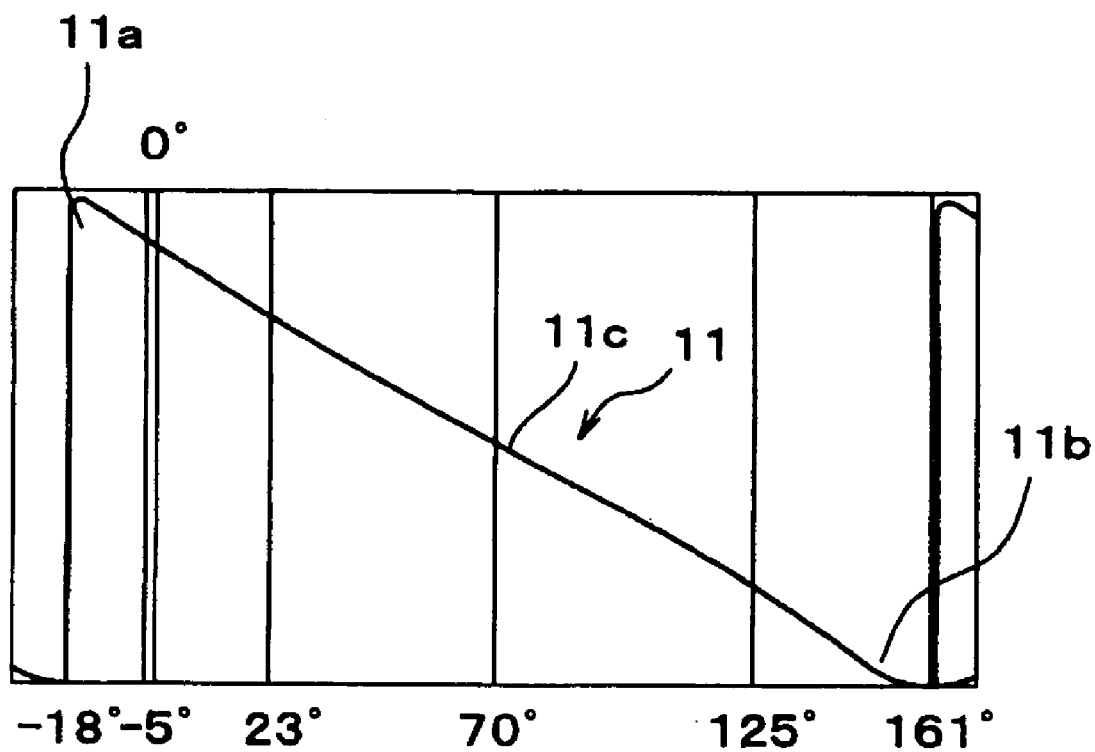
FIG. 14 is a development elevation of a cam portion of the outer cam.
Figure 15:
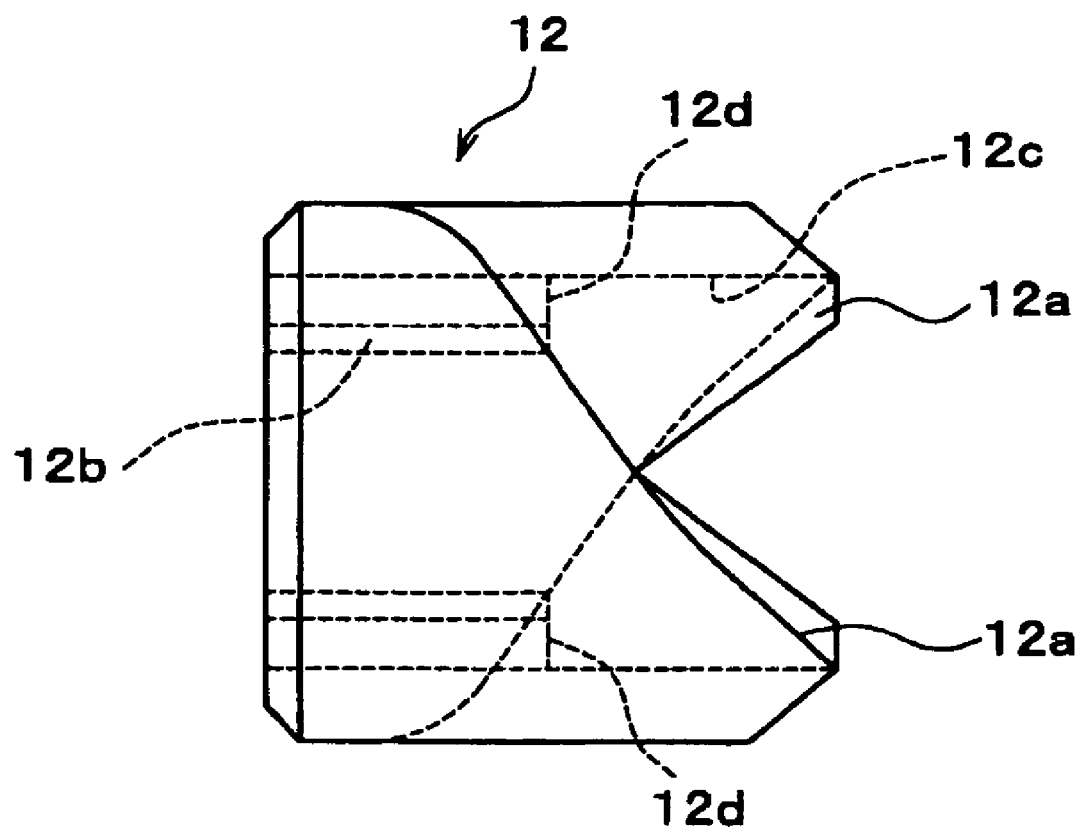
FIG. 15 is a plan view of an inner cam.
Figure 16:
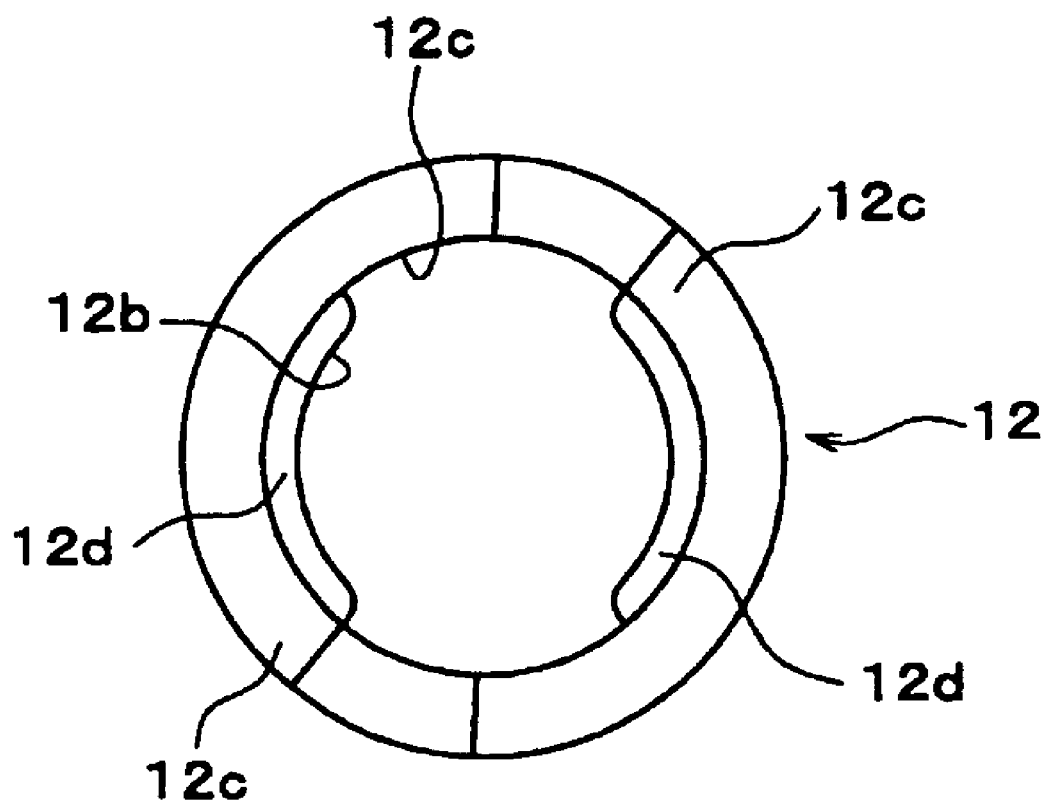
FIG. 16 is a right side view of the inner cam.
Figure 17:
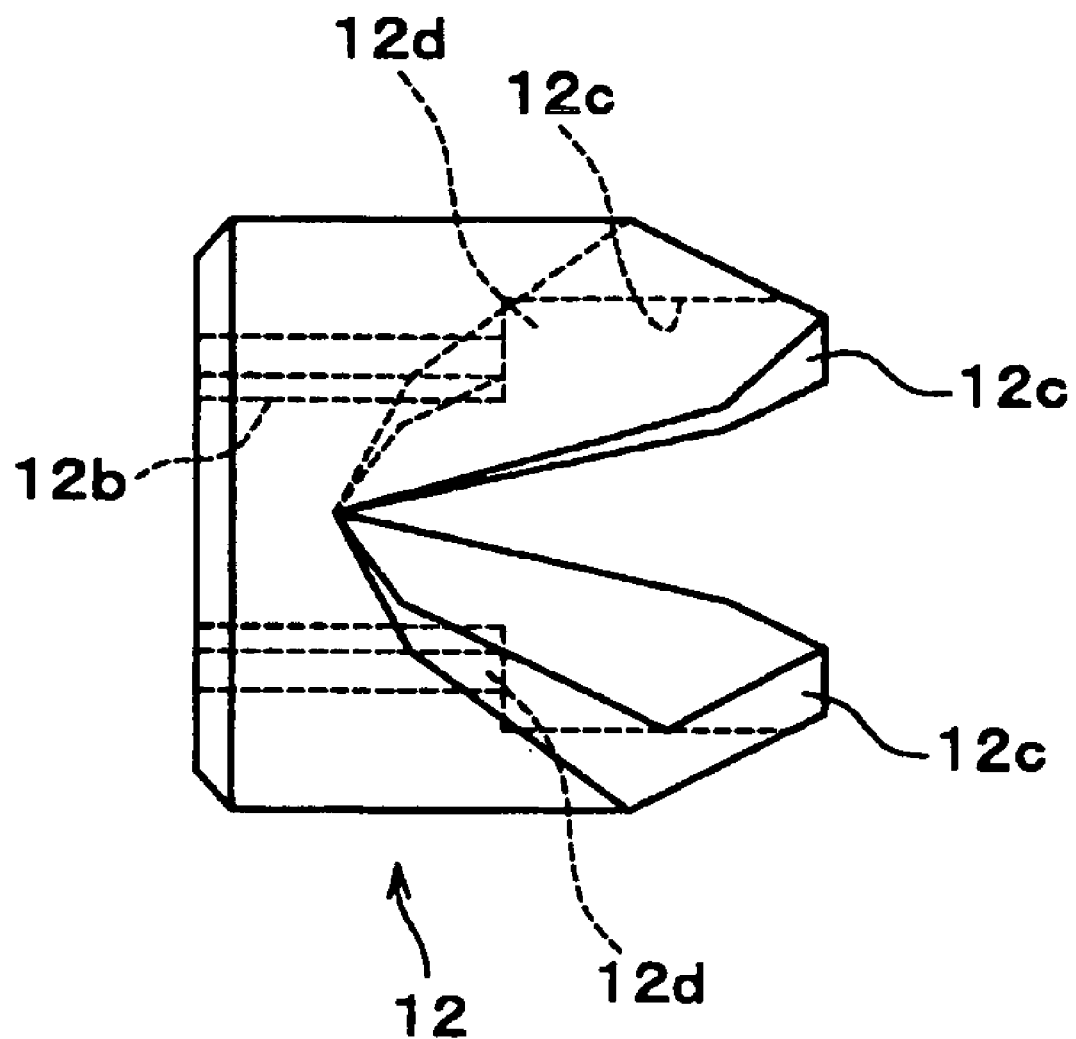
FIG. 17 is a front view of the inner cam.
Figure 18:
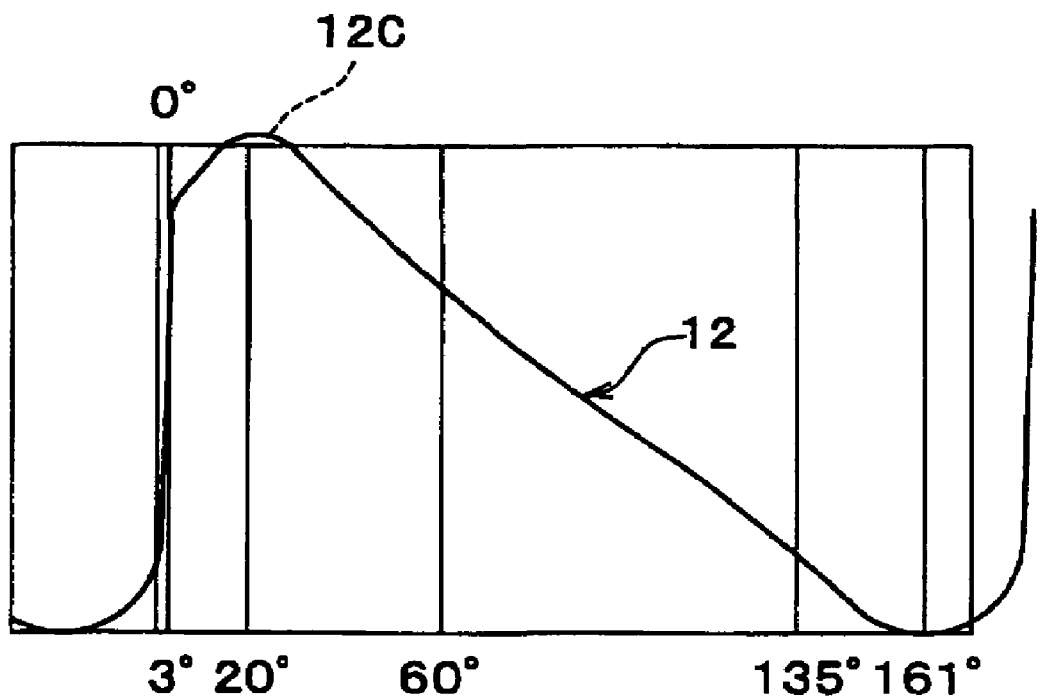
FIG. 18 is a development elevation of a cam portion of the inner cam.
Figure 19:
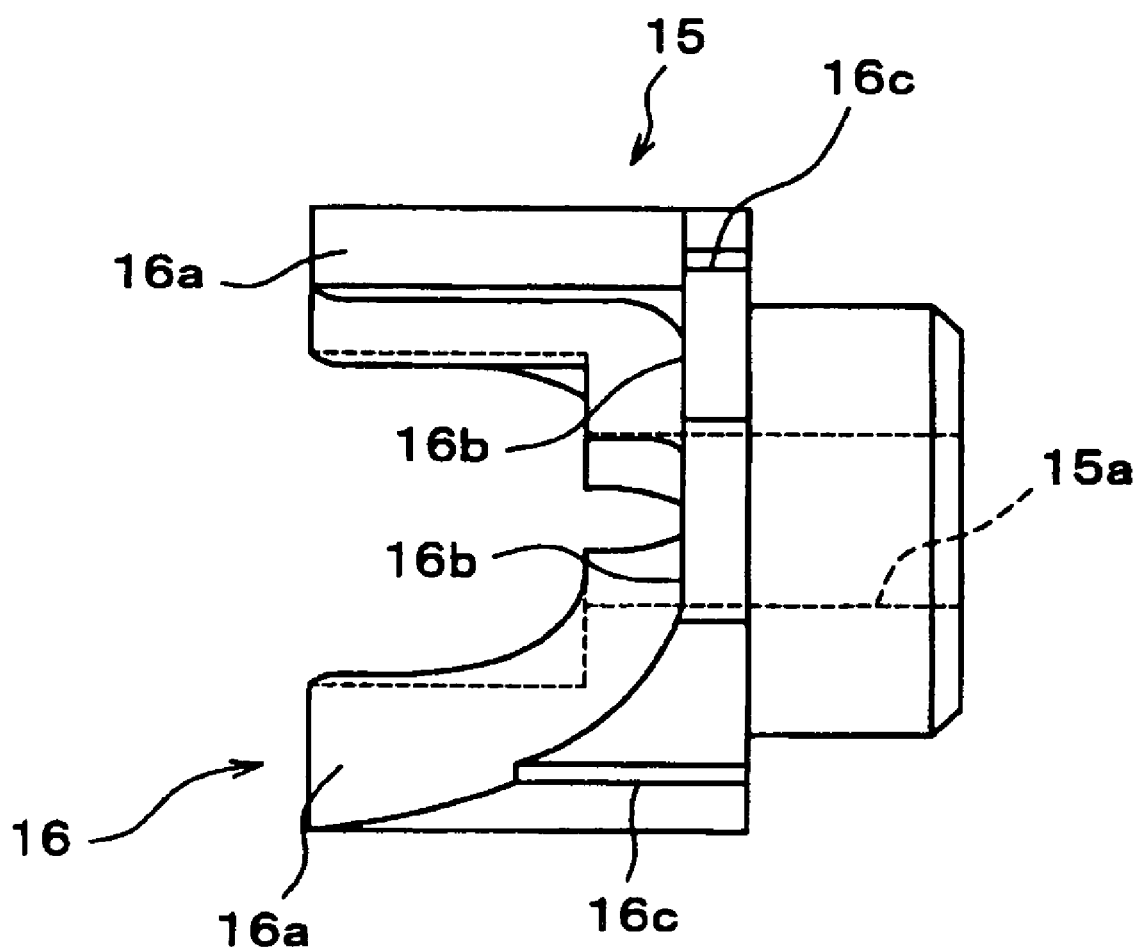
FIG. 19 is a plan view of a slider cam.
Figure 20:
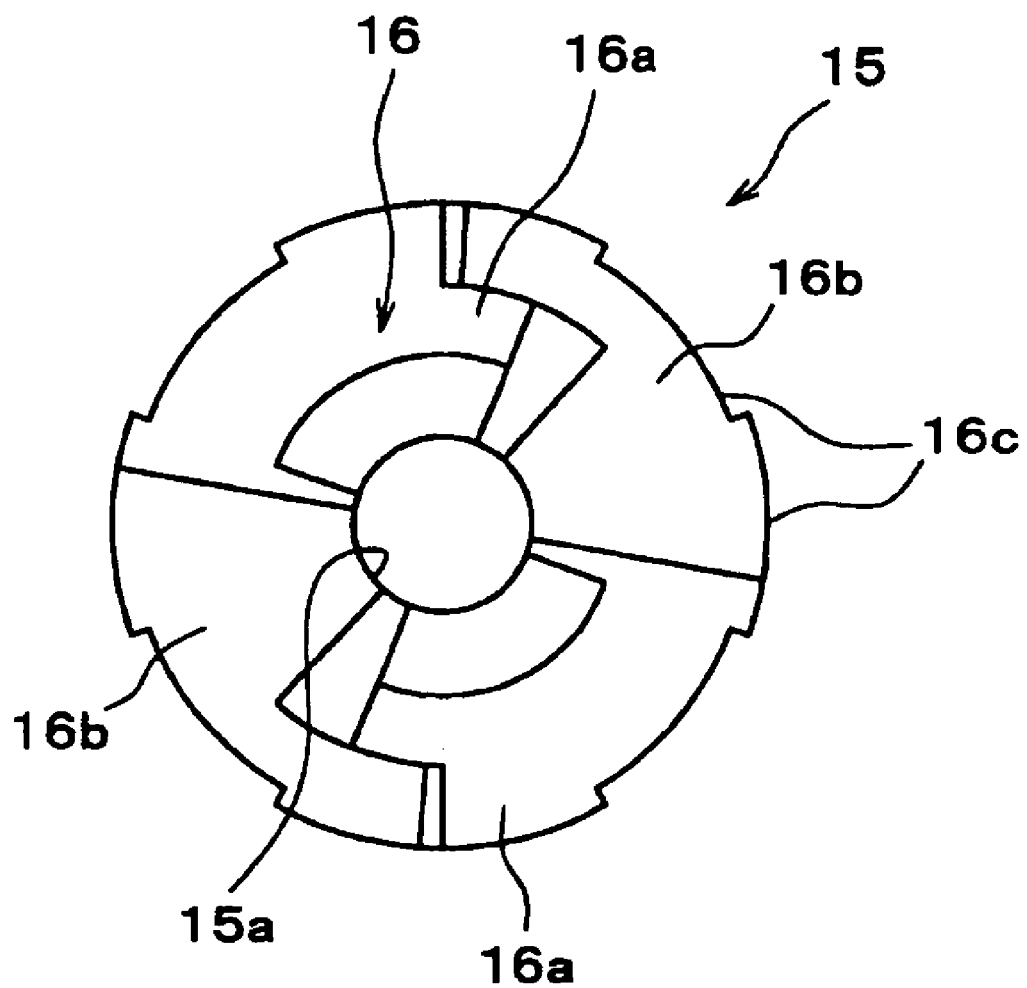
FIG. 20 is a left side view of the slider cam.
Figure 21:
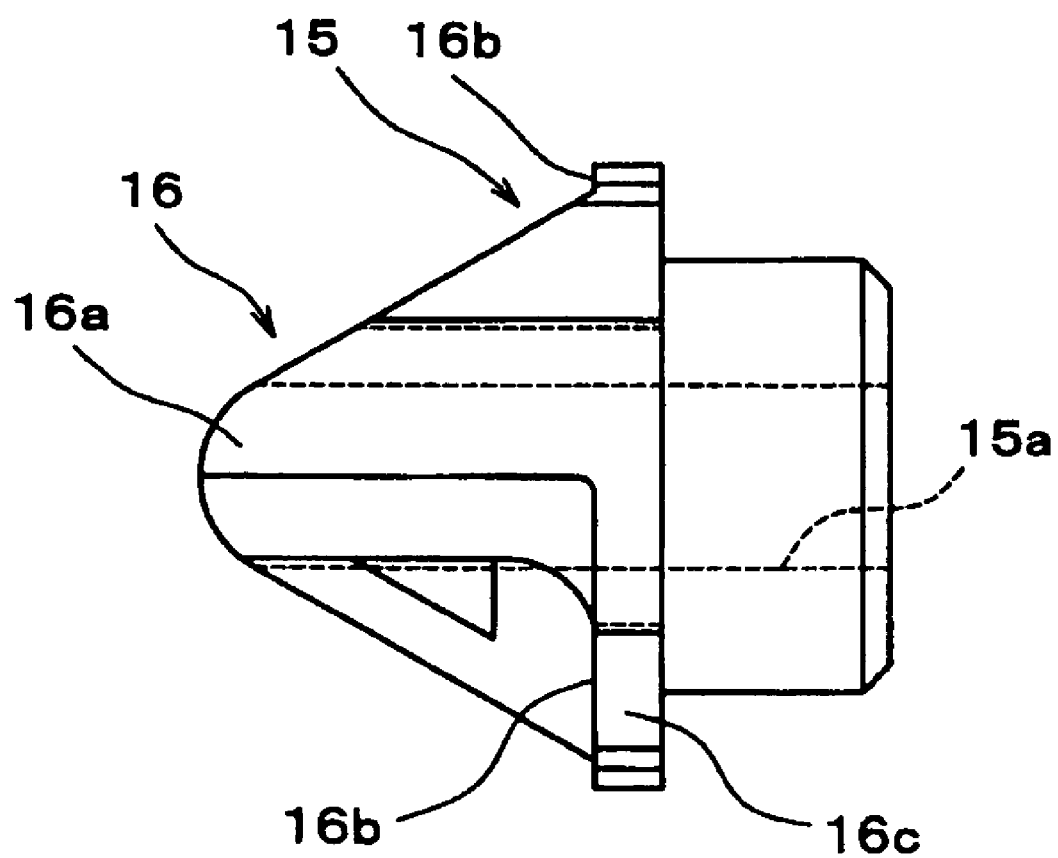
FIG. 21 is a front view of the slider cam.
Figure 22:
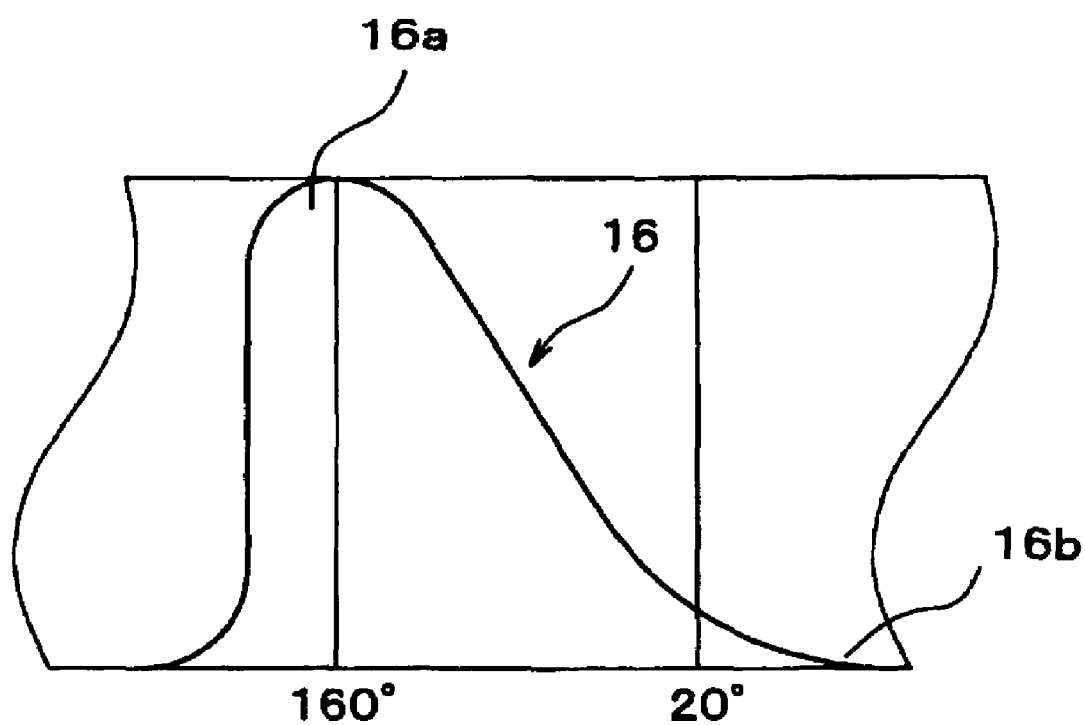
FIG. 22 is a development elevation of a cam portion of the slider cam.

There is provided an outer cam 10 accepting such side of the slide key 8 as having the arresting portions 8c, 8c inside in a slidable and rotatable manner and having a rotation arresting means 10a, which is composed of a convex portion and a concave portion as shown in FIG. 11 to FIG. 13, on the outer periphery thereof. The outer cam 10 is secured to the shaft 5 by passing the pin 9 arresting the aforementioned slide key 8 through a communicating hole 10c thereof. The outer cam 10 is inserted into a mounting hole 1b provided in the cylindrical mounting portion 1a of the transmitter section 1 and engages the rotation arresting means 10a thereof with an engaging portion 1c, which is composed of a convex portion and a concave portion provided inside of the mounting hole 1b, to thereby rotate together with the cylindrical mounting portion 1a of the transmitter section 1. Also, there is provided a cam portion 11 in the outer cam 10, the cam portion 11 being composed of a pair of convex portions 11a and a pair of concave portions 11b. Incidentally, the structure of the outer cam 10 is illustrated in detail in FIGS. 11 to 14.

As specifically shown in FIG. 2 and FIG. 3, an inner cam 12 is rotatably accommodated in a circular through hole 10b of the outer cam 10 which passes the arresting portions 8c, 8c part of the slide key 8 together with the shaft 5 slidably through a deformed through hole 10d thereof. The inner cam 12 further has a pair of arresting projections 12a, 12a projecting toward the cam portion 11 of the outer cam 10. Specifically, a deformed through hole 12b part of the inner cam 12, of which cross-section forming almost a gourd shape, engages with the arresting portions 8c, 8c of the slide key 8 on a constant basis, thereby blocked rotation. However, the inner cam 12 becomes rotatable in any direction when the slide key 8 is pressed via an after-mentioned push-button 13 against elastic force of an after-mentioned second compression spring 17, where the arresting portions 8c, 8c of the slide key 8, which were engaged with the deformed through hole 12b of the inner cam 12, disengages to thereby move to the circular through hole 12c part provided next to the deformed through hole 12b. Once the inner cam 12 rotates within the circular through hole 12c, then the arresting portions 8c, 8c of the slide key 8 engages with a stepped portion 12d provided between the deformed through hole 12b and the circular through hole 12c and does not return to the initial position, that is, the position to engage with the deformed through hole 12b, by themselves. Incidentally, the structure of the inner cam 12 is illustrated in detail in FIGS. 15 to 18.

Similarly, as specifically shown in FIGS. 2 to 3, next, there is provided a slider cam 15 in the position opposed to the inner cam 12 and the outer cam 10 with the shaft 5 passing through a through hole 15a which is provided axially in the center portion thereof. Incidentally, the structure of the slider cam 15 is illustrated in detail in FIGS. 19 to 22. In the slider cam 15, there is provided a cam portion 16 composed of a convex portion 16a and a concave portion 16b on a side confronting the inner cam 12 and the outer cam 10, and also provided a rotation arresting means 16c on the outer periphery thereof which is composed of a convex portion and a concave portion. The slider cam 15 is structured to be axially slidable but constrained rotation by the case body 6 so that the rotation arresting means 16c is engaged with an arresting portion 6d composed of a convex portion and a concave portions provided axially at the inner periphery of the case body 6.

As shown in FIGS. 2 and 3, subsequently, a first compression spring 14 being wound around the shaft 5 is elastically provided between the slider cam 15 and the sidewall 6b of the case body 6, and the second compression spring 17 being wound around the slide key 8 and having less elasticity than that of the first compression spring 14 is elastically provided between the flange portion 8d of the slide key 8 and the outer cam 10. Hence, the slider cam 15 is always forced to slide toward the inner cam 12 and the outer cam 10, that is, to the left in FIG. 1, and the slide key 8 is always forced to slide to the right in FIG. 2. Incidentally, a reference number 18 denotes the washer.

Figure 23:
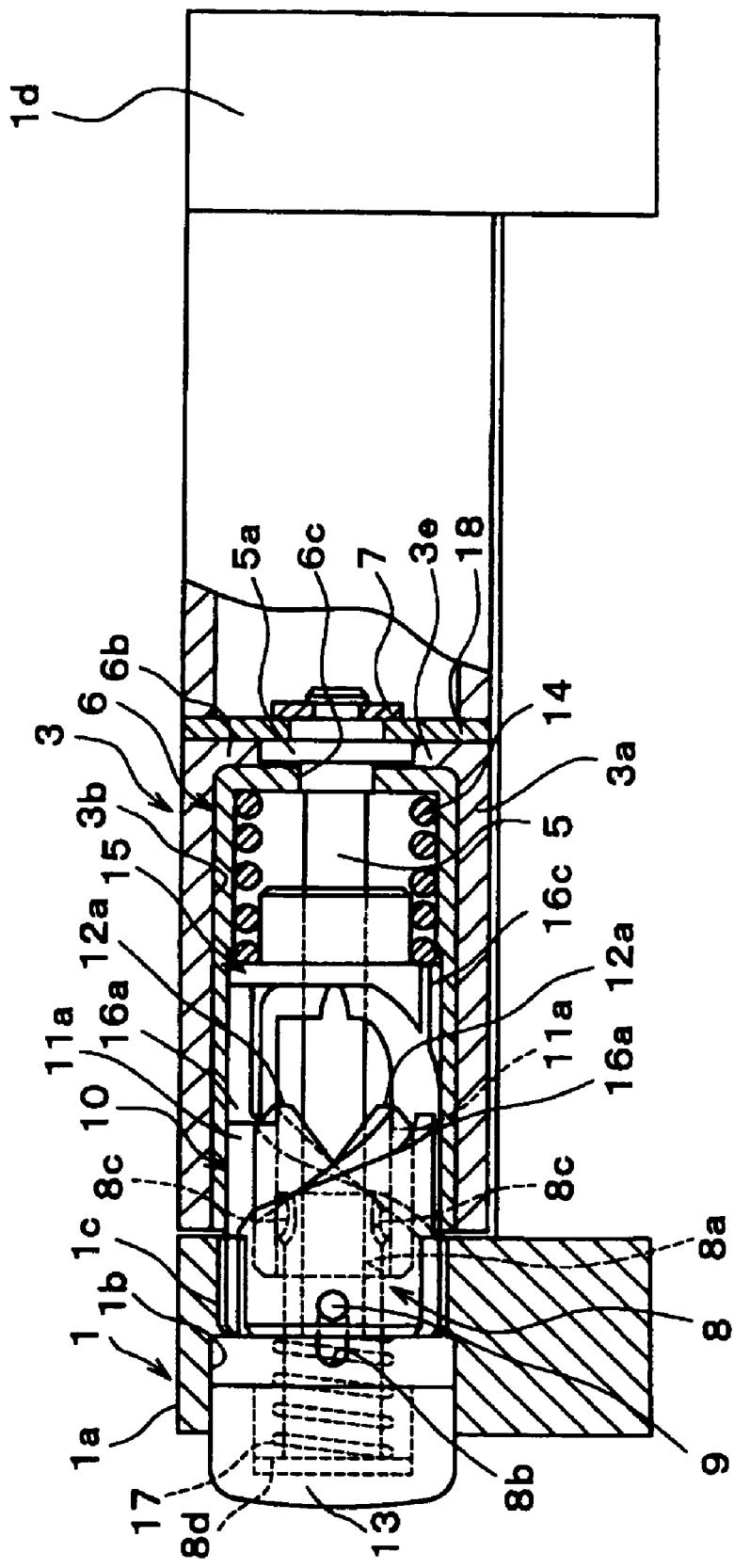
FIG. 23 is an explanatory view illustrating operation of the hinge for electronic equipment according to the present invention.

Accordingly, in the state where the receiver section 3 being the second member is folded toward the transmitter section 1 being the first member, as shown in FIG. 23, the slider cam 15 moves to the right and the convex portion 16a of the cam portion 16 thereof is arrested at between the convex portion 11a of the cam portion 11 of the outer cam 10 and the arresting projection 12a of the inner cam 12 by means of the arresting projection 12a. In this state, the inner cam 12 is forced to rotate clockwise seeing from the right side, though, kept locked in that the arresting portions 8c, 8c of the slide key 8 and the deformed through hole 12b are engaged. Specifically, the slide key 8 is connected with the outer cam 10 by means of the pin 9 and the outer cam 10 is engaged with the cylindrical mounting portion 1a of the transmitter section 1 being the first member by means of the rotation arresting means 10a of the outer cam 10, blocked rotation. Since the arresting portions 8c, 8c of the slide key 8, which is blocked rotation, is engaged with the deformed through hole 12b of the inner cam 12, the inner cam 12 being pushed and forced to rotate clockwise by the slider cam 15 is blocked rotation, as described above, with the arresting projection 12a, 12a thereof arresting and locking the convex portions 16a, 16a of the cam portion 16 of the slider cam 15.

In this state, when pressing the push-button 13 to the right in the drawing against elastic force of the second compression spring 17, the slide key 8 concurrently slides to the right in the drawing to thereby separate and move the arresting portions 8c, 8c of the slide key 8 from the deformed through hole 12b of the inner cam 12 to the circular through hole 12c side. The inner cam 12 thereby becomes rotatable and unlocks the convex portion 16a of the slider cam 15 so that the slider cam 15 is pushed to the left in the drawing by elastic force of the first compression spring 14 and guided to an inclined guide portion 11c of the convex portion 11a of the cam portion 11 of the outer cam 10, where rotation torque is generated and the slider cam 15, which is rotating clockwise seeing from the right in FIG. 2, slides down to the concave portion 11b of the cam portion 11 of the outer cam 10. In the meantime, the slider cam 15 is constrained rotation by the case body 6 which is constrained rotation by the cylindrical mounting portion 3a of the receiver section 3 being the second member, so that the receiver section 3 rotates clockwise together with the inner cam 12 and is opened automatically. An autorotation angle is approximately 160° according to the present embodiment. Shown in FIG. 2 and FIG. 3 are in this state. In the range of the open angle, the arresting portions 8c, 8c of the slide key 8 are arrested at the stepped portion 12d of the inner cam 12 to thereby allow the inner cam 12 to rotate.

For closing the opened receiver section 3, the transmitter section 1 is supported by one hand and the receiver section 3 is pushed counterclockwise and closed by another hand. Then, the slider cam 15 rotates counterclockwise together with the case body 6 with the convex portion 16a thereof pushing the arresting projection 12a of the inner cam 12 to the same direction. The inner cam 12 therefore rotates counterclockwise in similar fashion and goes up the inclined guide portion 11c of the outer cam 10 to thereby slide to the right in the drawing against elastic force of the first compression spring 14. When the receiver section 3 comes nearly to a closed position to the transmitter section 1, the arresting portions 8c, 8c of the slide key 8 come to the same position as of the deformed through hole 12b of the inner cam 12 so that the inner cam 12 returns to and is locked at the initial position, while the convex portion 16a of the cam portion 16 goes over the arresting projection 12a of the inner cam 12 effected by rotation force of the slider cam 15 to go into and thereby arrested at between the arresting projection 12a of the inner cam 12 and the convex portion 11a of the cam portion 11 of the outer cam 10 as shown in FIG. 23. Thus, the transmitter section 1 being the first member and the receiver section 3 being the second member are closed and locked in the closed state.

The embodiment described above refers to the case where the transmitter section being the first member and the receiver section being the second member are automatically opened up to an angle of 160°, whereas, the automatically opened angle is not limited thereto. Alternatively, it can be so formed that the automatically opened angle is up to for example 90° followed by manual opening and closing operation free to stop. In addition, the maximum open angle of 160° is just an example and there is no limitation. Further, it is only one hinge for electronic equipment that is used in the above-described embodiment, however, another hinge of different structure can be used additionally at the cylindrical mounting portion 1d on the right side of the transmitter section 1 and at the cylindrical mounting portion 3a of the receiver section 3. Such a hinge can be that generates friction torque at and over a predetermined open angle, or the like.

Subsequently, when opening the receiver section 3 from the transmitter section 1 without pressing the push-button 13, the receiver section 3 is pushed to and pulled from the transmitter section 1 in the direction to open using fingers. Then, the convex portion 16a of the cam portion 16 of the slider cam 15, which is blocked rotation by the arresting projections 12a, 12a of the inner cam 12, slides to the right in the drawing and goes over the arresting projections 12a, 12a of the inner cam 12 against pressing force of the first compression spring 14. The opening movement of the receiver section 3 from the transmitter section 1 is then allowed and opened automatically thereafter up to the aforementioned angle of 160°. When closed the receiver section 3 and the transmitter section 1 under such conditions, the inner cam 12 stays locked by the slide key 8 and does not rotate together with and according to the rotation of the slider cam 15, whereas, the convex portion 16a of the cam portion 16 of the slider cam 15 goes over by including thereinto the arresting projections 12a, 12a of the inner cam 12 in a locked state to thereby arrested and locked between the arresting projections 12a, 12a and the convex portions 11a, 11a of the cam portion 11 of the outer cam 10.

What is claimed is:

1. A hinge connecting a first member and a second member in an openable and closable manner to each other, said hinge for electronic equipment comprising:
   a case body having a rotation arresting means on an outer periphery thereof, inserted into and arrested at one of cylindrical mounting portions of said first member and said second member;
   a shaft mounted by passing axially through a center portion of said case body with an end portion side thereof being arrested at said case body;
   a slide key mounted on said shaft in a manner constrained rotation by the shaft and in an axially slidable manner, and having an arresting portion at an end portion thereof;
   an outer cam having a rotation arresting means on an outer periphery thereof and inserted into and arrested at one of the other cylindrical mounting portions of said first member and said second member, accommodating said slide key inside thereof in axially slidable manner and provided in a manner constrained rotation by said shaft;
   an inner cam accommodated in an axially slidable manner in said outer cam which passes said slide key together with said shaft axially through the center portion of said outer cam, having an arresting projection which disengages from the arresting portion of said slide key in accordance with a rotation angle;
   a slider cam provided in confrontation with said inner cam and said outer cam and passing said shaft axially through the center portion thereof, being mounted in an axially slidable manner in said case body in a manner constrained rotation;
   a first compression spring elastically provided between said slider cam and said case body;
   a second compression spring elastically provided between said slide key and said outer cam and having less elastic force than that of said first compression spring; and
   a push-button mounted on said slide key, wherein
   said outer cam and said inner cam have cam portions in a same direction and said slider cam has a cam portion on the side confronting the cam portions of said outer cam and said inner cam; a convex portion of the cam portion of said slider cam normally engages with the arresting projection of said inner cam of which rotation is blocked by said slide key, whereas, a pressing operation of said push-button disengages the arresting portion of said slide key from the arresting projection of said inner cam so that the cam portion of said slider cam is guided to the cam portion of said outer cam to thereby rotate together with said case body.

2. The hinge for electronic equipment according to claim 1, wherein said inner cam comprises:

a deformed through hole for engaging with the arresting portion of said slide key to block rotation of said slide key;

a circular through hole for allowing rotation of the arresting portion of said slide key; and a stepped portion provided to block an axial movement of the arresting portion in the circular through hole in accordance with the rotation angle.

3. The hinge for electronic equipment according to claim 1, wherein the means for allowing said slide key to slide axially under conditions constrained rotation against said shaft is a long hole provided axially by passing radially through said slide key and a pin mounted on said shaft which engages with the long hole, and at the same time, a means for securing said outer cam to said shaft is the pin.

4. An electronic equipment wherein said hinge for electronic equipment according to claim 1, is used in a connecting section of a first member and a second member connected in an openable and closable manner to each other.

* * * * *